United States Patent
Yang

(10) Patent No.: US 11,036,947 B2
(45) Date of Patent: Jun. 15, 2021

(54) COLOR BAR CODE, CODE DETERMINING METHOD AND CODE DETERMINING SYSTEM

(71) Applicant: PixArt Imaging Inc., Hsin-Chu (TW)

(72) Inventor: Shu-Sian Yang, Hsin-Chu (TW)

(73) Assignee: Pix Art Imaging Inc., Hsin-Chu (TW)

( * ) Notice: Subject to any disclaimer, the term of this patent is extended or adjusted under 35 U.S.C. 154(b) by 63 days.

(21) Appl. No.: 16/151,356

(22) Filed: Oct. 4, 2018

(65) Prior Publication Data
US 2019/0266371 A1 Aug. 29, 2019

Related U.S. Application Data

(60) Provisional application No. 62/634,199, filed on Feb. 23, 2018.

(51) Int. Cl.
*G06K 19/00* (2006.01)
*G06K 7/14* (2006.01)
*G06K 19/06* (2006.01)

(52) U.S. Cl.
CPC ....... *G06K 7/1413* (2013.01); *G06K 19/0614* (2013.01); *G06K 19/06028* (2013.01)

(58) Field of Classification Search
CPC .......... G06K 7/1413; G06K 19/06028; G06K 19/0614
USPC ............................. 235/462.04, 487, 494, 456
See application file for complete search history.

(56) References Cited

U.S. PATENT DOCUMENTS 6,032,861 A * 3/2000 Lemelson ............... G06K 7/14
235/456
2005/0218237 A1* 10/2005 Lapstun .......... G06K 19/06037
235/494

* cited by examiner

*Primary Examiner* — Karl D Frech
(74) *Attorney, Agent, or Firm* — Winston Hsu

(57) ABSTRACT

A color bar code comprising a first code block. The first code block comprises: a header region, comprising at least one header color bar, wherein the header color bar includes a predetermined asymmetric optical feature; and a code region, comprising at least one code color bar. The color kind or a color sequence of the code color bar indicates a code. Such color bar code can comprise more information and the contained therein is more easily to be acquired. A corresponding code determining method and a corresponding code determining system are also disclosed.

23 Claims, 12 Drawing Sheets

COLOR BAR CODE, CODE DETERMINING METHOD AND CODE DETERMINING SYSTEM

CROSS REFERENCE TO RELATED APPLICATIONS

This application claims the benefit of U.S. Provisional Application No. 62/634,199, filed on Feb. 23, 2018. The contents of which are incorporated herein by reference.

BACKGROUND OF THE INVENTION

1. Field of the Invention

The present invention relates to a color bar code, a code determining method and a code determining system, and relates to a color bar code, a code determining method and a code determining system which can contain a code with more information and can more easily acquire a correct code.

2. Description of the Prior Art

A bar code is applied to indicate some information such as a product name and a product price. FIG. 1 is a schematic diagram illustrating a conventional bar code. As illustrated in FIG. 1, the bar code 100 comprises a plurality of black bars B_1-B_3 (only three of them are marked). The black bars B_1-B_3 may have variety widths and the distances/gaps between neighboring black bars could be different. The information contained in the bar code 100 depends on the widths of the black bars B_1-B_3 and the distances between the black bars B_1-B_3.

However, the information of the bar code 100 is limited since the information only depends on at least one of the widths of the black bars and the gaps between the black bars. Besides, in order to read the correct information of the bar code 100, a specific reader in a specific direction is needed, thus is non-convenient for a user.

SUMMARY OF THE INVENTION

Therefore, one objective of the present invention is to provide a color bar code which can contain a code with more information and is more easily for acquiring the code contained therein.

Another objective of the present invention is to provide a code determining method and a code determining system which can more easily acquire a correct code contained in the color bar code.

One embodiment of the present invention discloses a color bar code comprising a first code block. The first code block comprises: a header region, comprising at least one header color bar, wherein the header color bar includes a predetermined asymmetric optical feature; and a code region, comprising at least one code color bar. The color kind or a color sequence of the code color bar indicates a code.

Another embodiment of the present invention discloses a code determining method, for determining a code contained in a color bar code comprising a first code block including a header region with at least one header color bar and a code region with at least one code color bar. The code determining method comprises: (a) determining a starting point based on the header region; and (b) determining the code contained in the color bar code based on a color kind or a color sequence of the code color bar. The header color bar includes a predetermined asymmetric optical feature.

Another embodiment of the present invention discloses a code determining system, for determining a code contained in a color bar code region comprising a first code block including a header region and a code region, wherein the header color bar comprises at least one header color bar including a predetermined asymmetric optical feature and wherein the code region comprises at least one code color bar. The code determining system comprises: a color bar code reader, configured to read the color bar code; and a code determining circuit, configured to determine a starting point according to the header region and to determine the code contained in the color bar code according to a color kind or a color sequence of the code color bar, based on the color bar code read by the color bar code reader.

In view of above-mentioned embodiments, the color bar code can comprise more information than a conventional bar code since the code contained in the color bar code depends on color kind or color sequence of various colors. Besides, the color determining system can more easily acquire a correct code since more than one code block are included in the color bar code.

These and other objectives of the present invention will no doubt become obvious to those of ordinary skill in the art after reading the following detailed description of the preferred embodiment that is illustrated in the various figures and drawings.

DETAILED DESCRIPTION

Different embodiments are provided in following descriptions to explain the concept of the present invention. Please note, the components of each embodiment can be implemented by hardware (e.g. circuit, device, apparatus) or hardware with software (e.g. a processor installed with at least one program). Besides, the components of each embodiment can be separated to more components or be integrated to fewer components. Additionally, the term "first", "second", "third" in following descriptions are only for explaining different components or different steps, but do not mean the sequence thereof.

Figure 1:
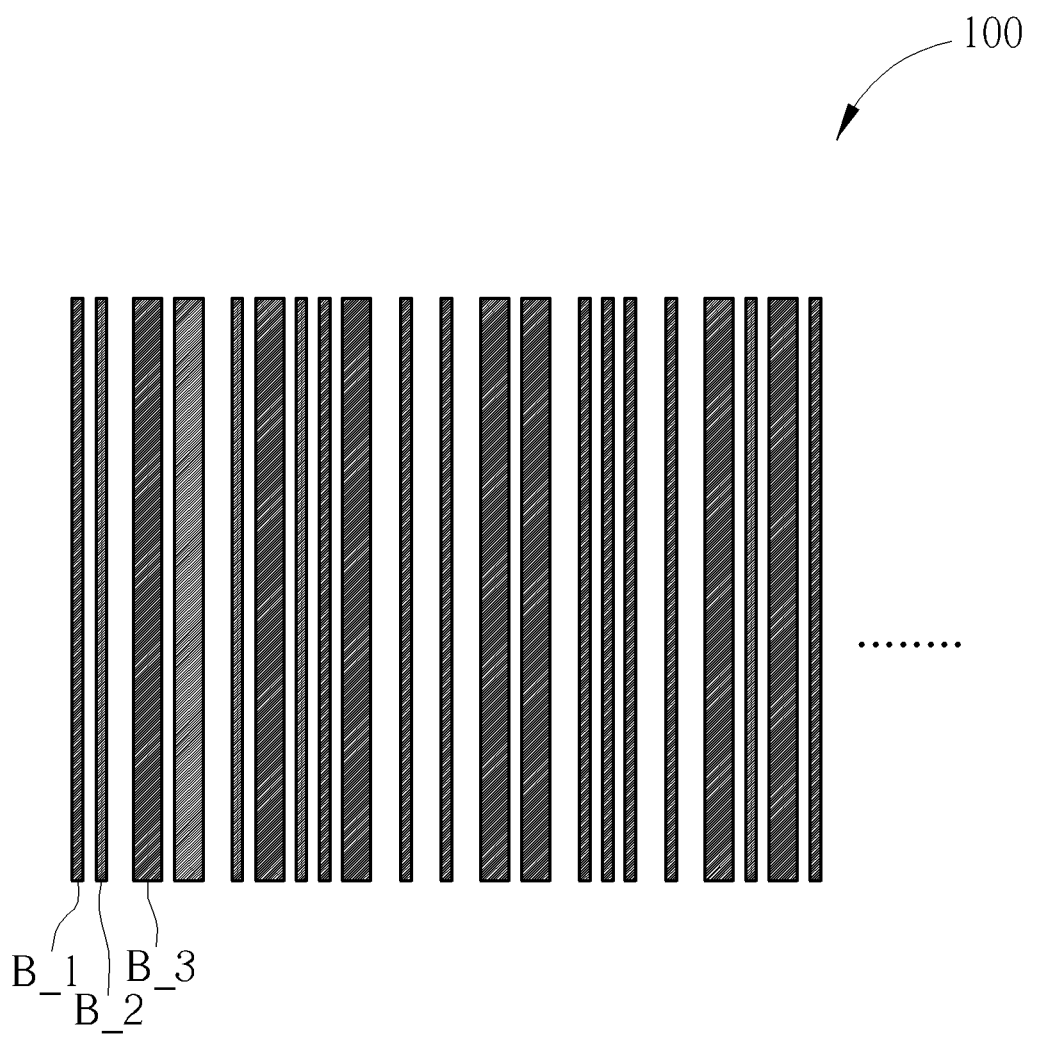
FIG. 1 is a schematic diagram illustrating a conventional bar code.
Figure 2A:
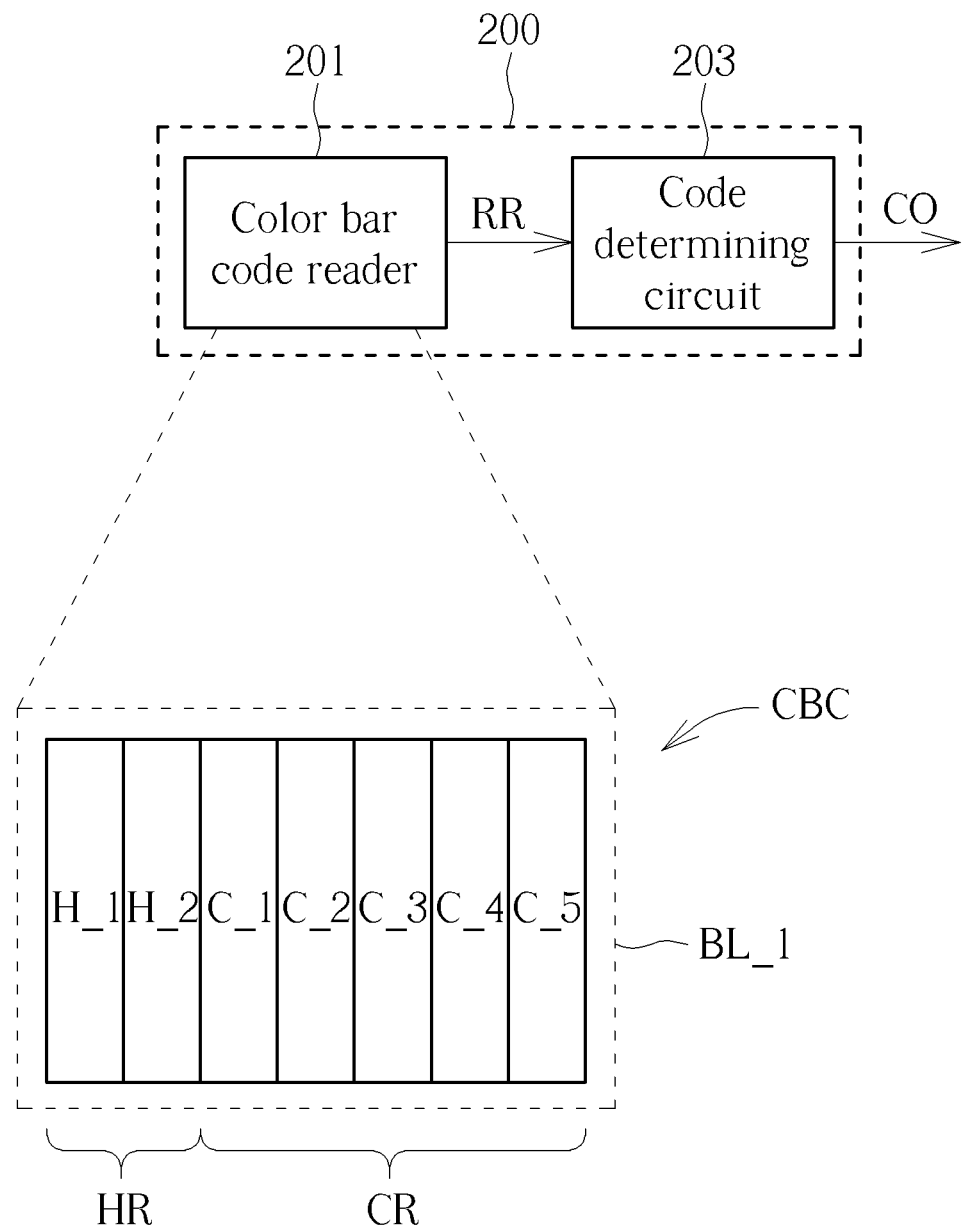
FIG. 2A, FIG. 2B and FIG. 2C are schematic diagrams illustrating color bar codes and code determining systems according to different embodiments of the present invention.

FIG. 2A is a schematic diagram illustrating a color bar code CBC and a code determining system 200 according to one embodiment of the present invention. As illustrated in FIG. 2A, the color bar code CBC comprises a first code block BL_1, which comprises a header region HR and a code region CR.

The header region HR is used to define position of the code region CR and the reading sequence of the code region CR, and the code region CR is used to define a code by at least one of the color kind and the color sequence contained in the code region CR. The header region HR comprises at least one header color bar, and each of the at least one header color bar may be formed in one or more color kinds.

In one embodiment, the header region HR preferably has a predetermined asymmetric optical feature to define the position of the code region CR corresponding to the header region HR. For example, the asymmetric optical feature of the header region HR includes a specific color change from red to blue to define the code region CR been positioned next to the bar colored in blue.

Figure 2B:
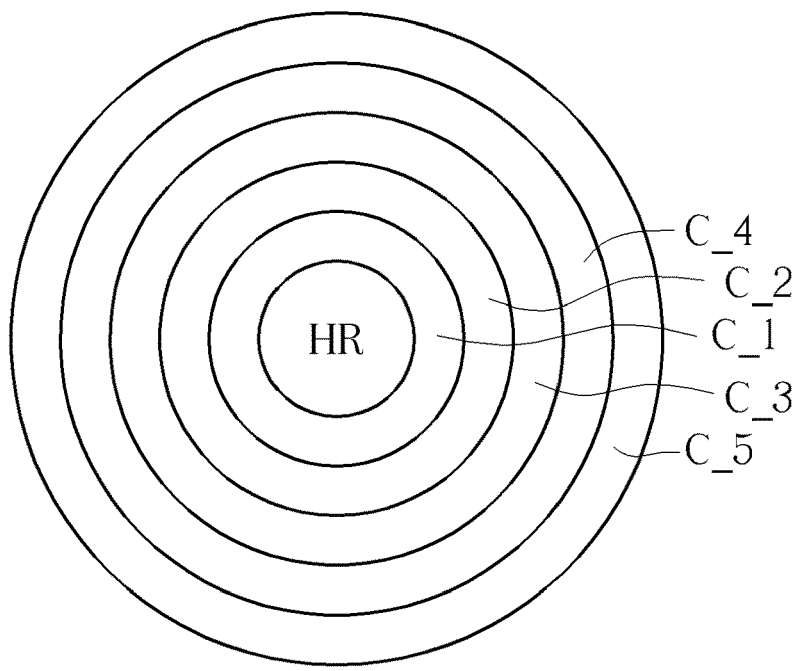
Figure 2C:
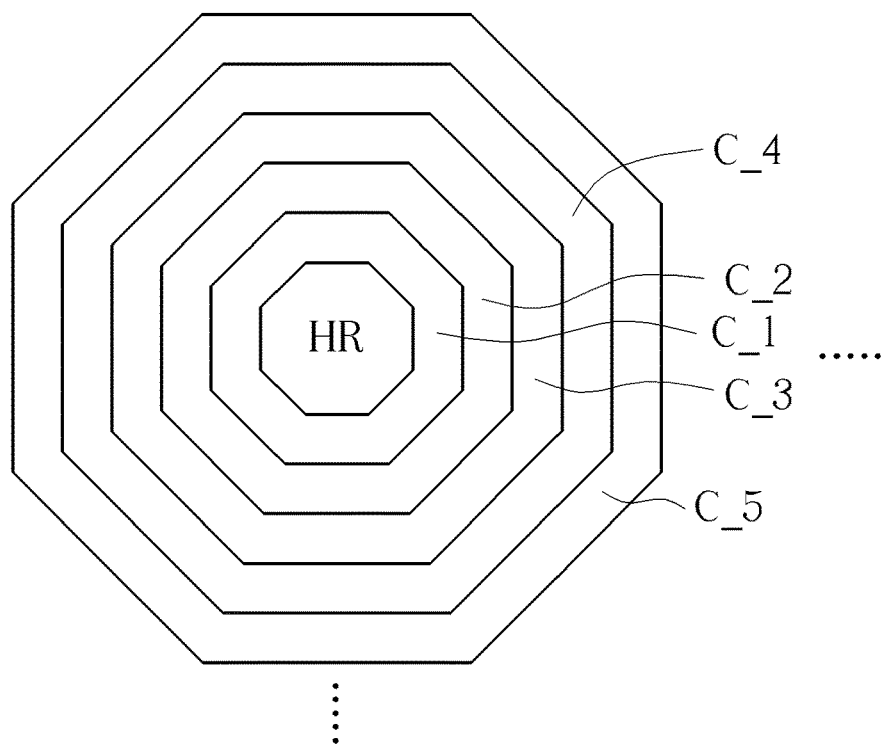

In yet another embodiment, the header region HR may not have the asymmetric optical feature, and the code region CR is positioned surrounding the header region HR as shown in FIG. 2B and FIG. 2C. Once the header region HR is identified, any direction (or most directions) from the header region HR to outside region could be used to decode the code region CR.

Furthermore, the header region HR may varies in several types, and so the type of the header region HR could contribute the decode of the code region CR. For example, when the header region HR include a color change from red to blue then the followed code region CR may be decoded with one additional parameter A, and when the header region HR include a color change from red to green then the followed code region CR may be decoded with one additional parameter B.

In the example of FIG. 2A, the header region HR comprises two header color bars H_1, H_2. The above predetermined asymmetric optical feature can comprise at least one of following optical features: a specific width of at least one of the header color bar, a specific shape of at least one of the header color bar, a specific color sequence of a plurality of the header color bars, or a specific color variation of a plurality of the header color bars.

For example, the predetermined asymmetric optical feature comprises at least one width of at least one of the header color bar and at least one shape of at least one of the header color bar. For another example, the predetermined asymmetric optical feature comprises a color variation of a plurality of the header color bars. In one embodiment, the asymmetric optical feature may be a combination of the above features, such as a combination of a color sequence and a width or a combination of color change and shape.

In another embodiment, the header region HR may comprise at least one header color bar without a predetermined asymmetric optical feature. The color bar code CBC comprises only one code block BL_1, and the header color bar combined with a background region could provide the asymmetric optical feature.

The code region CR defines at least one color bar code. The code region CR comprises one or more code color bars, and each code color bar may be formed in one or more color kinds. The color bar code is defined by the color kind or the color sequence of the one or more code color bars, wherein when the code region CR includes one code color bar then the code is defined by the color kind in the code color bar, and when the code region CR includes a plurality of code color bars and each code color bar is formed in unique color kind then the code is defined by the color sequence of the code color bars.

In this embodiment, the code region CR comprises code color bars C_1-C_5. The header color bars H_1, H_2 and the code color bars C_1-C_5 can have different colors, but can have the same colors as well. In this embodiment, each of the code color bars C_1-C_5 and the header color bars H_1, H_2 is formed in unique color kind and all of the code color bars C_1-C_5 and the header color bars H_1, H_2 are not overlap in color kind.

The code (e.g. a digital code) contained in the color bar code CBC can be determined (i.e. decoded) by a code determining system 200 comprising a color bar code reader 201 and a code determining circuit 203. The color bar code CBC can be read by the color bar code reader 201 to generate a reading result RR, and then the code determining circuit 203 determines the code contained in the color bar code CBC according to the reading result RR. In following embodiments, the color bar code reader 201 is an image sensor and the reading result RR comprises the image of the color bar code CBC. The code determining circuit 203 determines a starting point based on the header region HR, and determines the code contained in the color bar code CBC based on a color kind or a color sequence of the code color bar C_1-C_5.

For example, in one embodiment, the header code color bar H_1 is printer in color red (R), the header code color bar H_2 is printed in color green (G), the code color bar C_1 is printed in color yellow (Y), the code color bar C_2 is printed in color purple (P), the code color bar C_3 is printed in color orange (O), the code color bar C_4 is printed in color white (W) and the code color bar C_5 is printed in color blue (B).

In one embodiment, each color kind represents one digital code, thus the code contained in the color bar code CBC can be 000(R)-001(G)-010(Y)-011(P)-100(O)-101(W)-111(B) from the code color bar C_1 to the code color bar C_5. The header code color bars H_1 and H_2 indicate a start point of the color bar code CBC, thus are not determined as any code.

In another embodiment, each color change represents one digital code, thus the code contained in the color bar code CBC depends on the color sequence of the code color bar C_1-C_5. In such case, the code contained in the color bar code CBC from the code color bar C_1 to the code color bar C_5 can be:

00000(R-G)-00001(G-Y)-00010(Y-P)-00100(P-O)-01000(O-W)-10000(W-B).

Please note, in such case, the code is not limited to depend on a color sequence of two color kinds, the code can depend on a color sequence of more than two color kinds. For example, in another embodiment, the color sequence R-G-Y means the code 001011 and the color sequence P-O-W means the code 110110. It will be appreciated that the above-mentioned digital codes are only examples for explaining and do not mean to limit the scope of the present invention.

Figure 3:
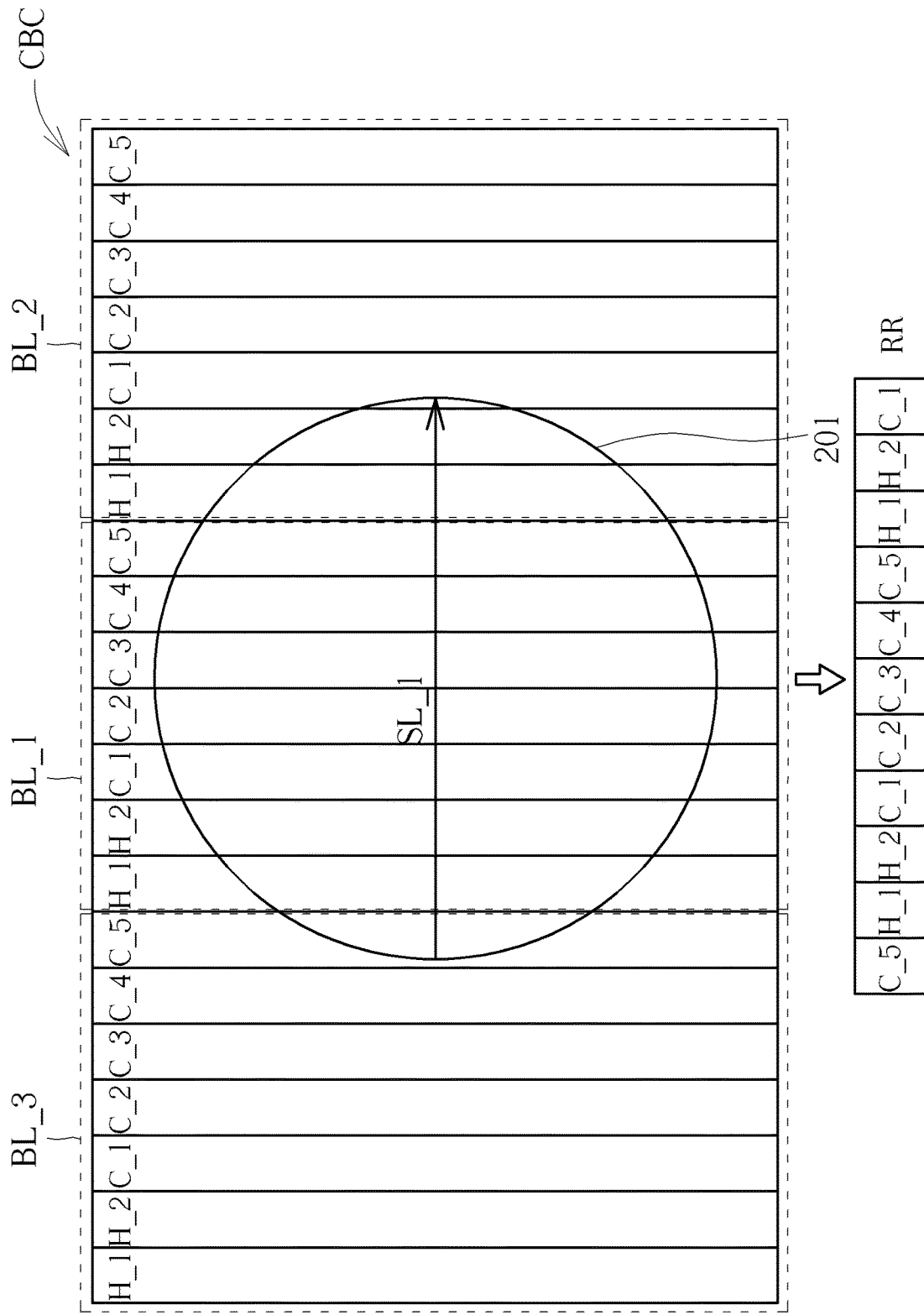
FIG. 3, FIG. 4, FIG. 5, FIG. 6, FIG. 7, FIG. 8 and FIG. 9 are schematic diagrams illustrating color bar codes according to different embodiments of the present invention.

The color bar code CBC can comprise more than one code blocks. FIG. 3 is a schematic diagram illustrating a color bar code according to another embodiment of the present invention. As illustrated in FIG. 3, the color bar code CBC comprises a second code block BL_2, which comprises a header region having an arrangement the same as an arrangement for the header region HR of the first code block BL_1, and comprises a code region having an arrangement the same as an arrangement for the code region CR of the first code block BL_1. That is, the header region of the second code block BL_2 also comprises the header color bars H_1, H_2, and the code region of the second code block BL_2 also comprises the code color bars C_1-C_5. The second code block BL_2 follows an ending of the first code block BL_1. The color bar code CBC can comprise more than two code blocks arranged in such manner.

In the embodiment of FIG. 3, the color bar code reader 201 is a circle shape, which may be formed by a shape of the color bar code reader 201 or a shape of a device that the color bar code reader 201 is provided in. Also, the color bar code reader 201 has a scan line SL_1 to scan the color bar code CBC. The scan line SL_1 scans the code color bar C_5 of a third code block BL_3 at a left side of the first code block BL_1, the whole first code block BL_1, and header color bars H_1, H_2, code color bar C_1 of the second code block BL_2. In such case, the code determining circuit 203 firstly identifies the header region as the starting point, and then determines the code contained in the color bar code CBC according to a predetermined number of code color bars following the starting point.

For example, if the predetermined number is 5, the code determining circuit 203 determines the code contained in the color bar code CBC according to five code color bars following the starting point. Therefore, in the embodiment of FIG. 3, the code determining circuit 203 determines the code of the color bar code CBC according code color bars C_1-C_5. If a number of the code color bars following the header region HR is not the predetermined number, the code determining circuit 203 does not determine the code contained in the color bar code CBC according to such code color bars. For example, in the embodiment of FIG. 3, the code determining circuit 203 does not determine the code contained in the color bar code CBC according to the code color bar C_1 of the second code block BL_2 even if the header color bars H_1, H_2 of the second code block BL_2 exist in the image scanned by the scan line SL_1, since the number of code color bars following the header color bars H_1, H_2 of the second code block BL_2 does not match the predetermined number 5. The predetermined number can be, for example, stored in a storage device which the code determining circuit 203, or can be provided in real time (e.g. via a network).

In another embodiment, the predetermined number can be identified by at least one of the optical feature of the header region, such as the color change of the header color bars, the width of each header color bar or the numbers of the header color bar. For example, when the header region HR includes a color change from red to blue then the predetermined number is identified as five and when the header region HR includes a color change from red to green then the predetermined number is identified as six.

The color barcode reader 201 may not read a whole color barcode block each time. In such case, when the color barcode reader 201 already knows the above-mentioned predetermined number of the code color bars and how to identify starting point, then the color barcode reader 201 can combine two segments of different code blocks.

Figure 4:
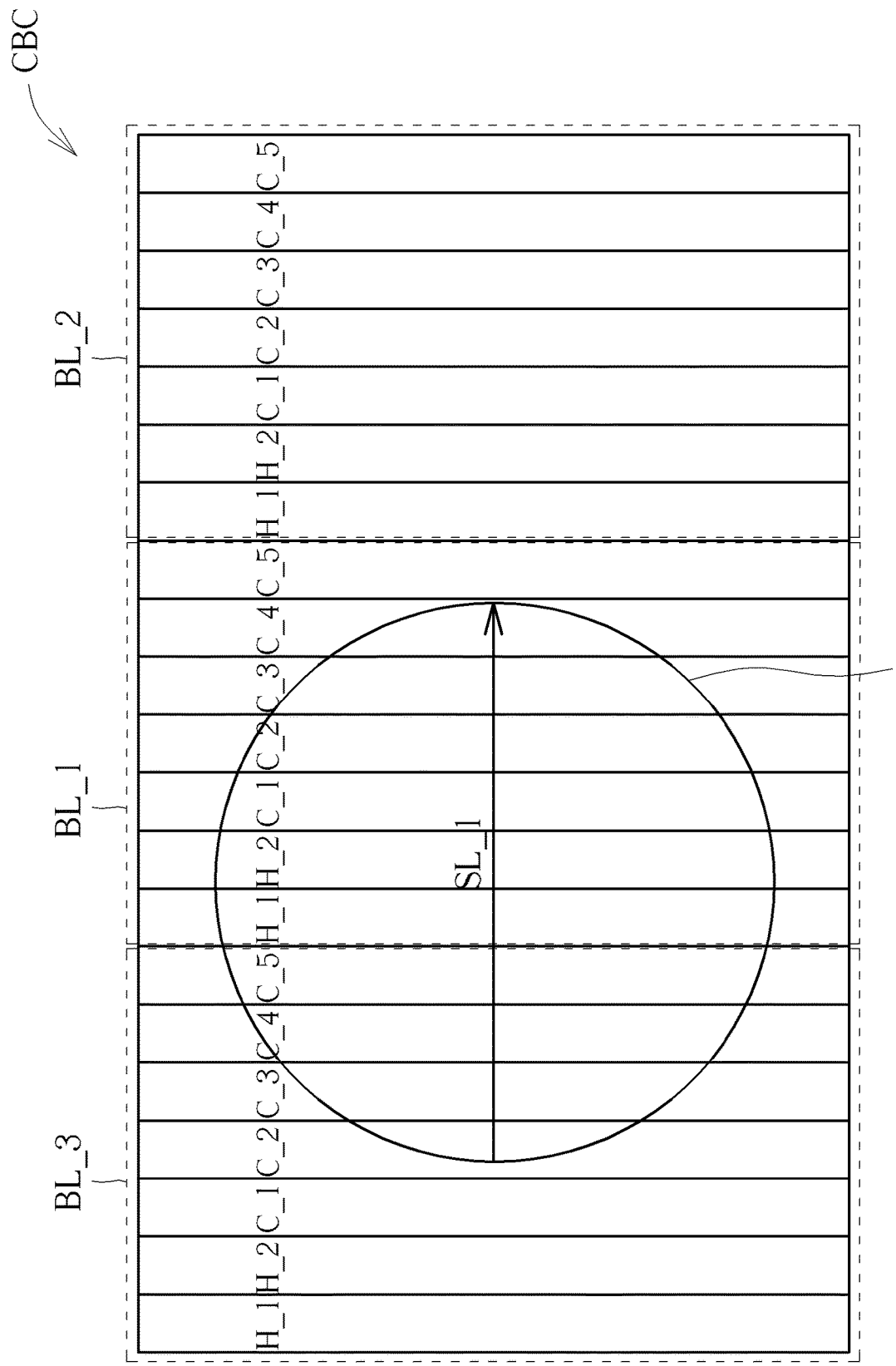

As illustrated in the embodiment of FIG. 4, when the color barcode reader 201 reads code color bars C_3-C_5 of the third code block BL_3 and header color bars H_1, H_2, code color bars C_1-C_3 of the first code block BL_1, the code determining circuit 203 can combine the code color bars C_3-C_5 of the third code block BL_3 and the code color bars C_1-C_2 in the first code block BL_1 to determine the code contained in the color bar code CBC. Alternatively, the code determining circuit 203 can combine the code color bars C_4-C_5 of the third code block BL_3 and the code color bars C_1-C_3 in the first code block BL_1 to determine the code contained in the color bar code CBC.

Briefly, the code determining circuit 203 determines the code contained in the color bar code CBC based on a color kind for a combination for at least one the code color bar of the first code block BL_1 and at least one the code color bar of the second code block BL_2, or a color sequence for a combination of at least one the code color bar of the first code block BL_1 and at least one the code color bar of the second code block BL_2. In one embodiment, a number for the code color bar of the first code block BL_1 and the code color bar of the second code block BL_2 for the combination equals to a predetermined number (e.g. 5 in above-mentioned embodiments).

Figure 5:
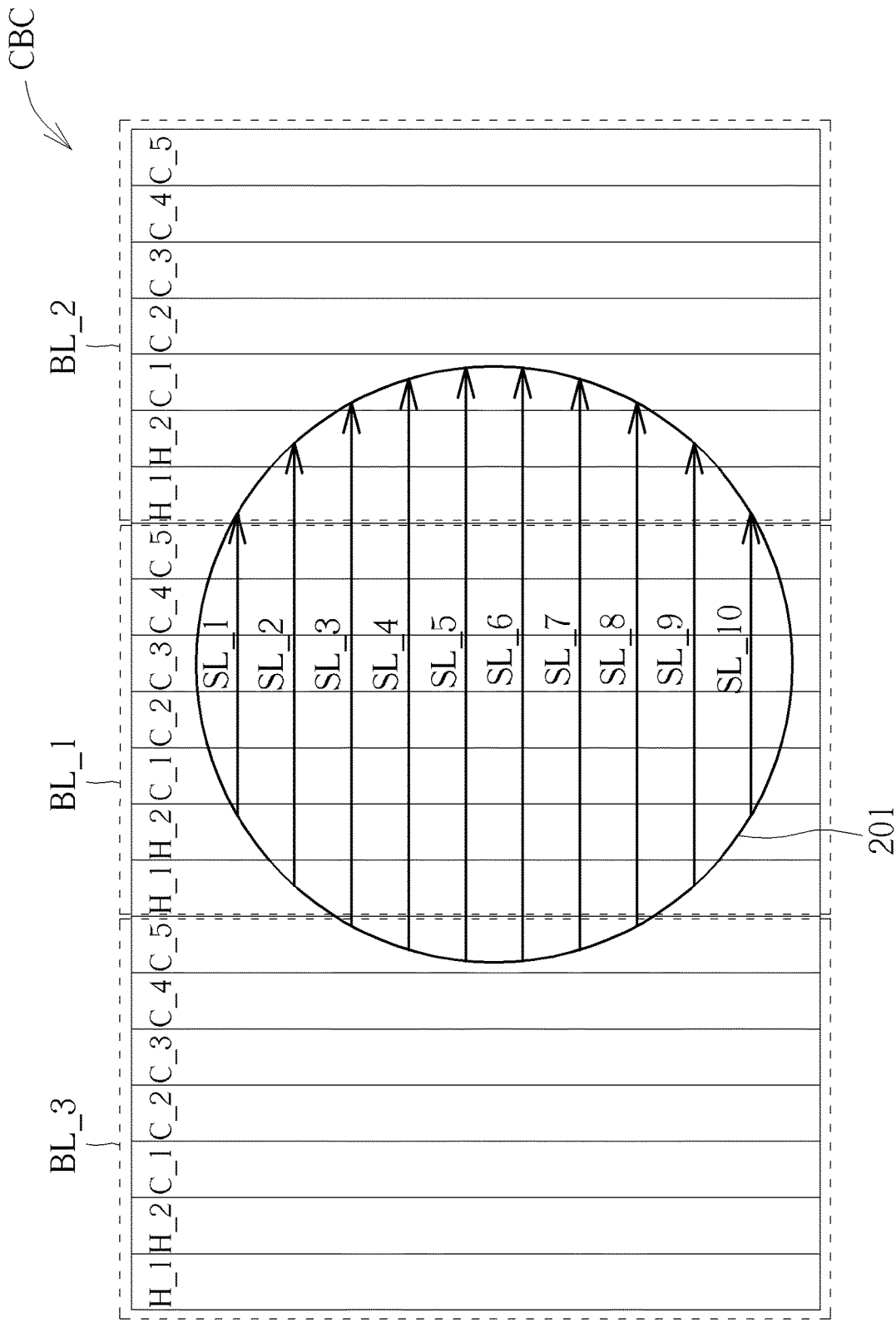

The color barcode reader 201 may have more than one scan lines. FIG. 5 is a schematic diagram illustrating color bar code according to one embodiment of the present invention. As illustrated in the embodiment of FIG. 5, the color bar code reader 201 comprises 10 scan lines SL_1-SL_10 and each one of the scan lines SL_1-SL_10 scan different number of color bars. For example, the scan line SL_1 scan the code color bars C_1-C_5 of the first code block BL_1, and the scan line SL_2 scan the header color bars H_1, H_2 and the code color bars C_1-C_5 of the second code block BL_2. Accordingly, the scan lines SL_1-SL_10 may acquire different scan results.

After that, the code determining circuit 203 can determine a code contained in the code color bar according to the scan result when at least one scan line cover a whole code block or two segments in neighboring code blocks can be combined. Therefore, the code determining circuit 203 can acquire a plurality of candidate codes corresponding to the scan results. Next, the code determining circuit 203 selects a most possible code from the candidate codes as the code contained in the color bar code CBC.

In one embodiment, the code determining circuit 203 determines a number of the scan lines which each of the candidate codes correspond to and selects the candidate code which corresponds to a maximum number of scan lines as the code contained in color bar code CBC. For example, if the scan lines SL_2, SL_3, SL_5, SL_6, SL_7 and SL_9 correspond to a first candidate code and scan lines SL_4 and SL_8 correspond to a second candidate code, the code determining circuit 203 selects the first candidate code as the code contained in the color bar code CBC. Via such mechanism, the correct code can be acquired even if the color bar code reader 201 is not located in a very precise location.

As above-mentioned, the color bar code CBC can have more than one code blocks. However, the arrangement for the code blocks is not limited to follow the same direction such as the arrangement illustrated in FIG. 3.

Figure 6:
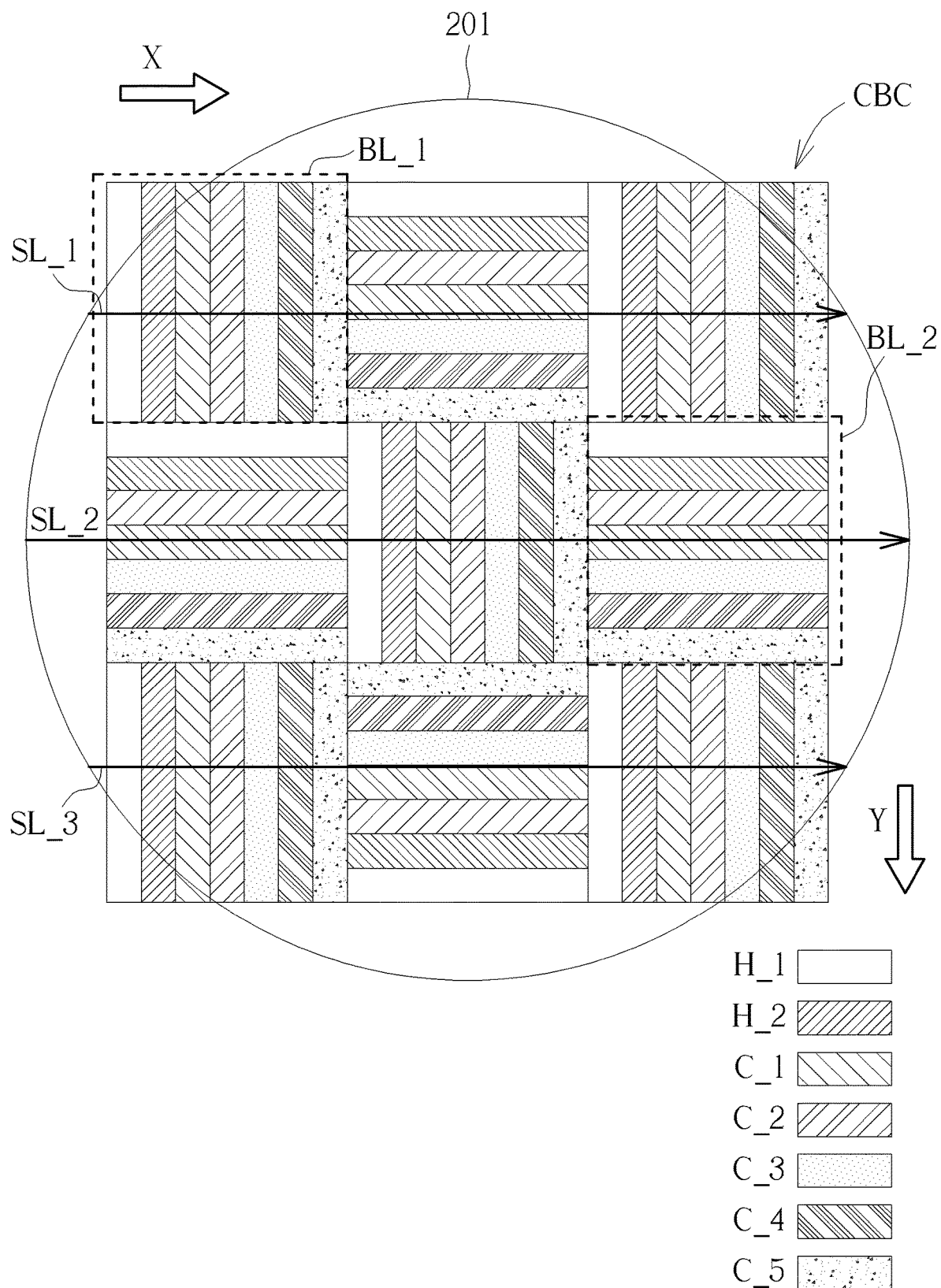

In the embodiments of FIG. 6-FIG. 9, for the convenience of reading, the color bars are shown as different types of lines or points rather than the above-mentioned symbols H_1, H_2, C_1 . . . . For example, a blank bar indicates the header color bar H_1, and a bar with back slashes indicates the header color bar H_2. Please refer to FIG. 6, which illustrates a color bar code CBC according to another embodiment of the present invention. As illustrated in FIG. 6, the color bar code CBC comprises a plurality of code blocks, but only the first code block BL_1, the second code block BL_2 are marked. The color bars of the first code block BL_1, which include header color bars H_1, H_2 and code color bars C_1-C_5, are arranged following the direction X. Also, the color bars of the second code block BL_2 are arranged following the direction Y. In the embodiment of FIG. 6, an angle between the direction X and the direction Y is 90°. However, the angle can be any angle larger than 0°. Other code blocks of the color bar code CBC can be arranged in the same manner. The term "direction" means a direction that a next color bar is located. Take FIG. 6 for example, following the header color bar H_1, a next header color bar H_2 is located in the X direction next to the header color bar H_1.

The arrangement of the color bar code CBC in FIG. 6 is more convenient for a user using the color barcode reader 201 to acquire a correct code. As illustrated in FIG. 6, the color barcode reader 201 may cover a plurality of whole code blocks. For example, the scan lines SL_1-SL_3 of the code determining circuit 203 can acquire 5 codes contained in the code blocks, and these codes are the same. For more detail, the codes contained in the code blocks at an upper side and a lower side of the second code block BL_2, the code contained in the center code block at a left side of the second code block BL_2, and the code contained in the code block at the lower left corner of the color bar code CBC can be acquired by the code determining circuit 203.

In some cases, due to noise or other unexpected errors, the 5 codes may not be the same, and then the code determining circuit 203 can select one of the 5 codes as the code contained in the color bar code CBC. In one embodiment, the code determining circuit 203 selects the code which corresponds to a maximum number of code blocks in the 5 completely scanned code blocks. For example, the scan lines SL_1-SL_3 of the color barcode reader 201 scan 5 whole code blocks in the color bar code CBC and the code determining circuit 203 accordingly acquires 3 first codes and 2 second codes. The second codes are generated due to the noise or other errors. In such case, the code determining circuit 203 selects the first code as the code contained in the color bar code CBC, since 3 is larger than 2.

Also, based on the arrangement for the color bar code CBC in FIG. 6, a correct code can still be acquired even if the scan lines SL_1 and SL_2 are tilted and not parallel with the direction X or the direction Y.

Figure 7:
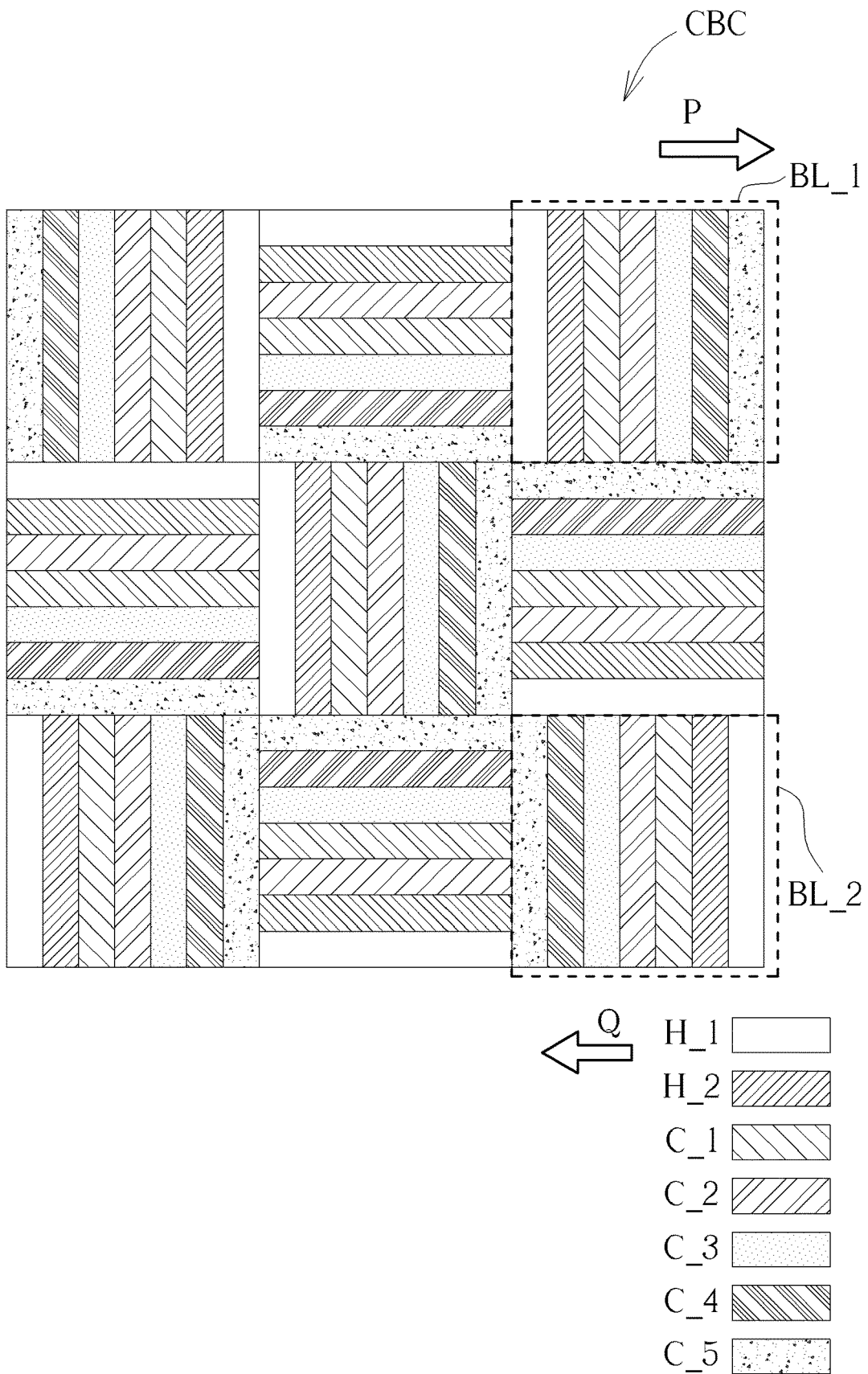

Please note the direction for the arrangement is not limited to the example illustrated in FIG. 6. As illustrated in FIG. 7, the first code block BL_1 is arranged following a direction P and the second code block BL_2 is arranged following a direction Q. The direction P and the direction Q are opposite. That is, an angle between the direction P and the direction Q is 180°.

Figure 8:
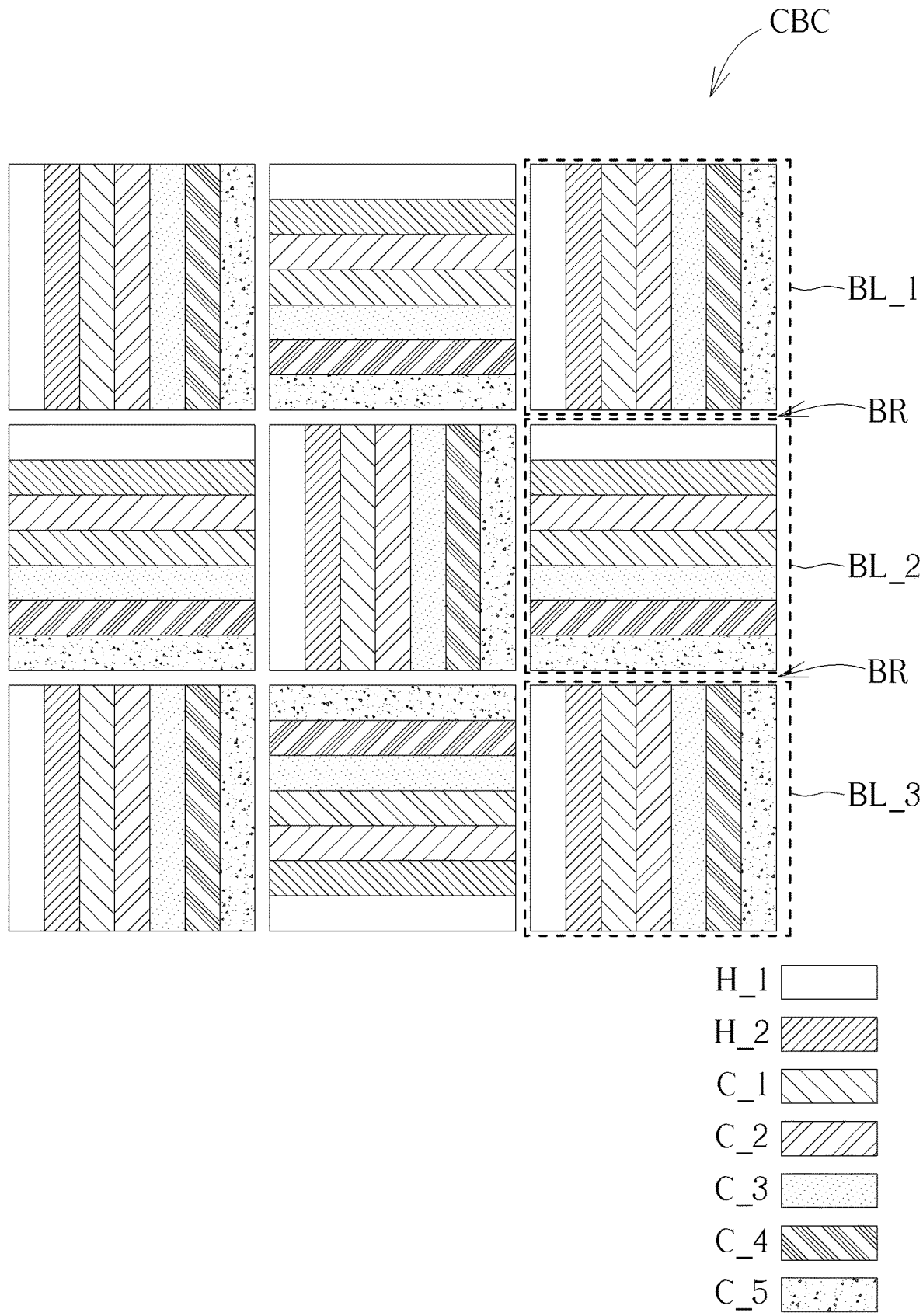

Further, in one embodiment, the color bar code CBC further comprises buffer regions located between code blocks. As illustrated in FIG. 8, buffer regions BR are respectively located between the first code block BL_1 and the neighboring second code block BL_2, and located between the second code block BL_2 and the third code block BL_3 (i.e. between two adjacent code blocks). The buffer region BR can be empty or any predetermined color not applied for the color bar in the code block. For example, the color of the buffer region BR is grey thus the code determining circuit 203 ignores the color grey when determines the code contained in the color bar code CBC.

Figure 9:
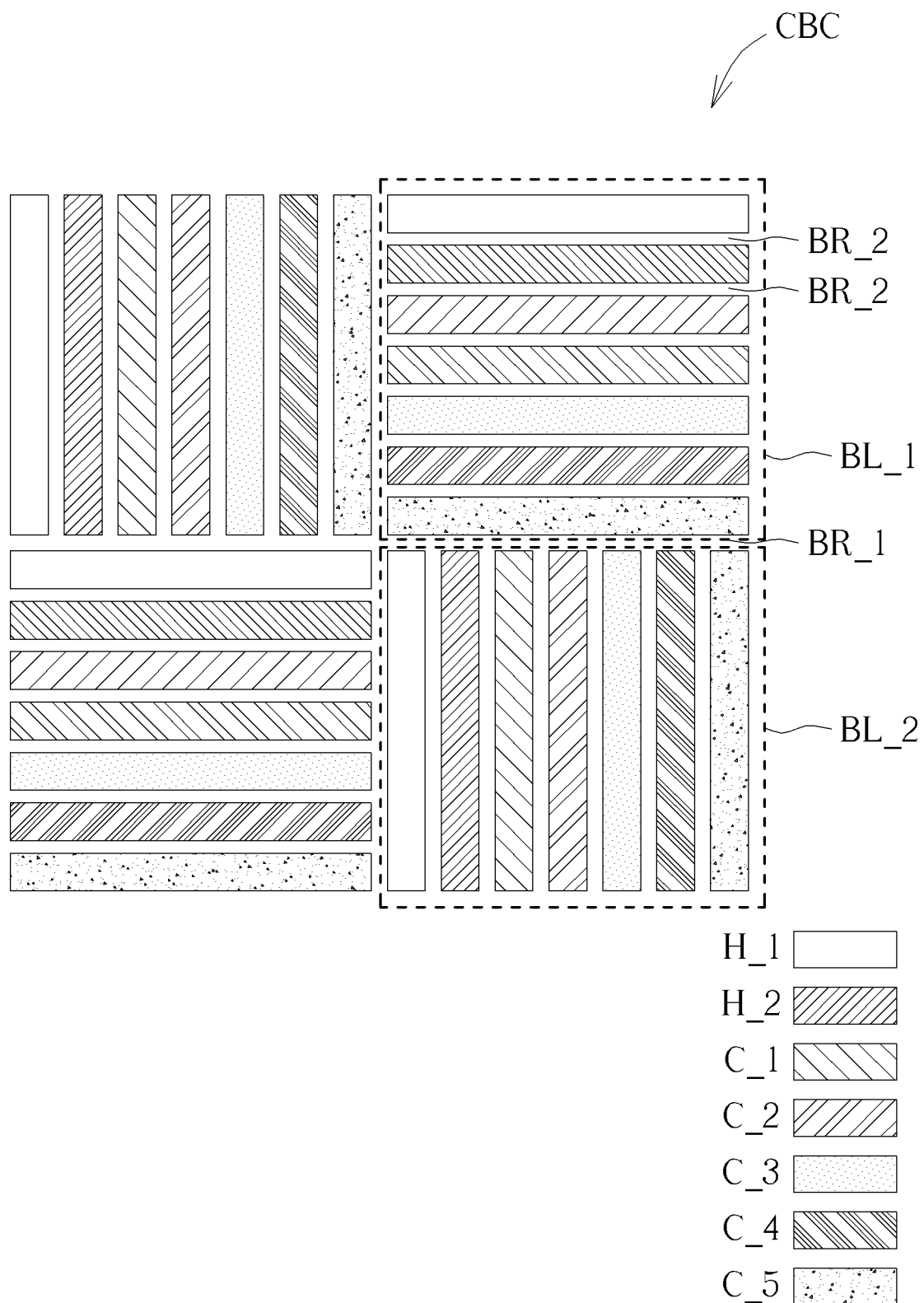

The buffer region BR can also be provided between color bars rather than only between the code blocks, such as the example illustrated in FIG. 9. In the embodiment of FIG. 9, the buffer region BR_1 is located between the first code block BL_1 and the second code block BL_2. Besides, the buffer regions BR_2 are respectively located between color bars of the first code block BL_1 and between color bars of the second code block BL_2 (i.e. between two adjacent code bars). In one embodiment, the width of the buffer region BR_1 is larger than the width of the buffer region BR_2. Due to the buffer regions BR, BR_1 or BR_2, the vendor can print the color bat code CBC more precisely, since the color bars of the color bar code CBC are less likely to overlap.

Figure 10:
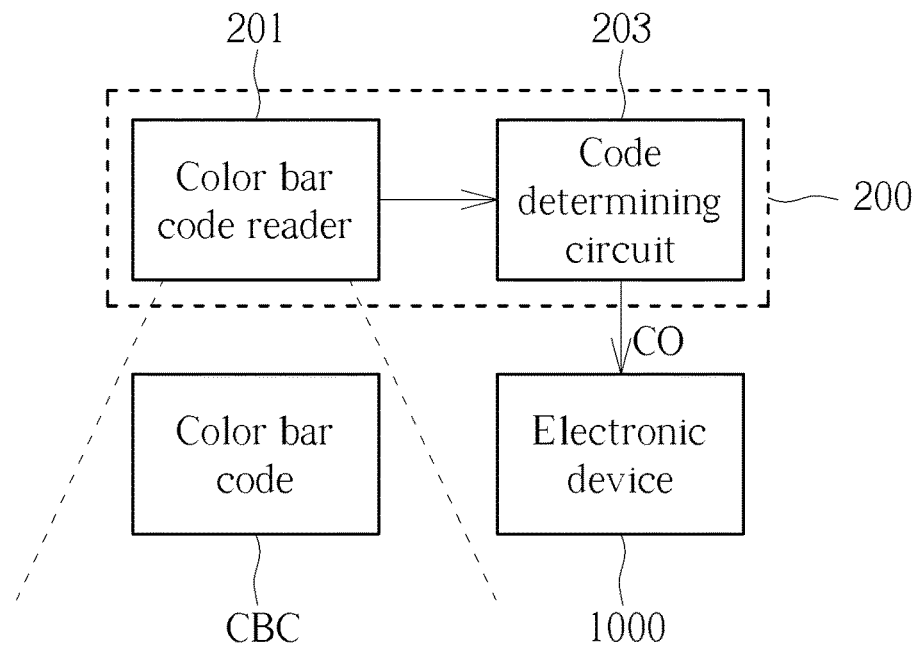
FIG. 10 is a block diagram illustrating an example that the code acquired from the color bar code is applied to control operations of an electronic device.

In one embodiment, the code CO acquired by the code determining system 200 is applied as a control code to control an electronic device. Please refer to FIG. 10, the code CO, which is a code contained in the color bar code CBC and acquired by the code determining system 200 is transmitted to an electronic device 1000, and then the electronic device 1000 operates according to the code CO.

In view of above-mentioned methods, a code determining method can be acquired. The code determining method is for determining a code contained in a color bar code (e.g. color bar code in FIG. 2) comprising a first code block (e.g. code block BL_1 in FIG. 2) including a header region (e.g. header region HR) with at least one header color bar and a code region (e.g. code region CR) with at least one code color bar. The code determining method comprises: (a) determining a starting point based on the header region; and (b) determining the code indicated by the color bar code based on a color kind or a color sequence of the code color bar. The header color bar includes a predetermined asymmetric optical feature.

Other detail steps can be acquired in view of above-mentioned embodiments, thus are omitted for brevity here.

Figure 11:
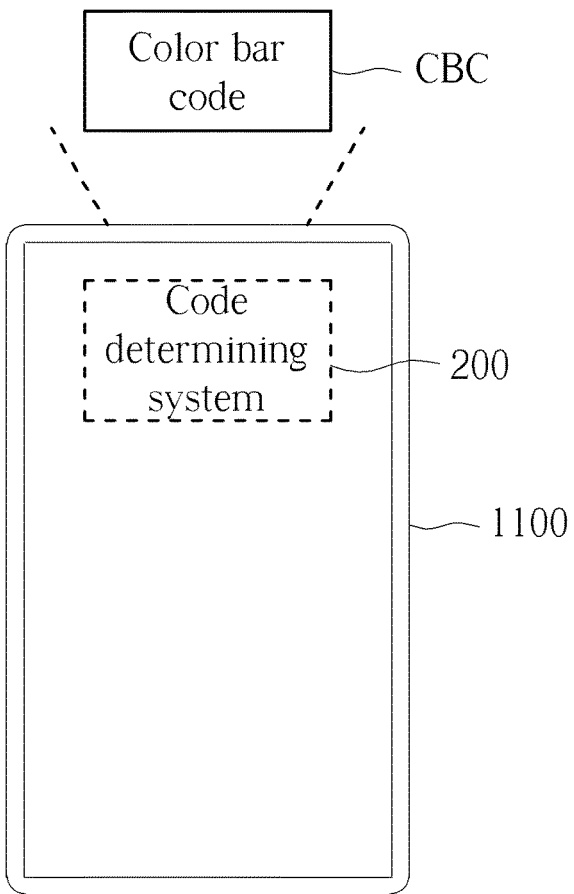
FIG. 11 and FIG. 12 are schematic diagrams illustrating examples for the applications of a color bar code.

In one embodiment, the code determining system 200 is located in a portable device that can be hold by a user. FIG. 11 is a schematic diagram illustrating an example for the application of a color bar code. In the embodiment of FIG. 11, the code determining system 200 is in a mobile phone 1100 and is applied to determine the code contained in the color bar code CBC. After the code contained in the color bar code CBC is acquired by the code determining system 200, the mobile phone 1100 operates according to the code. For example, the mobile phone 1100 can display specific information, play music, or display images according to the code. In one embodiment, the above-mentioned color bar code reader 201 of the code determining system 200 is the camera of the mobile. In another embodiment, the color bar code reader 201 comprises a lens for reading the color bar code CBS, and the lens can be located at any location of the mobile phone 1100. Also, the mobile phone 1100 can be replaced by any kind of portable electronic device.

Figure 12:
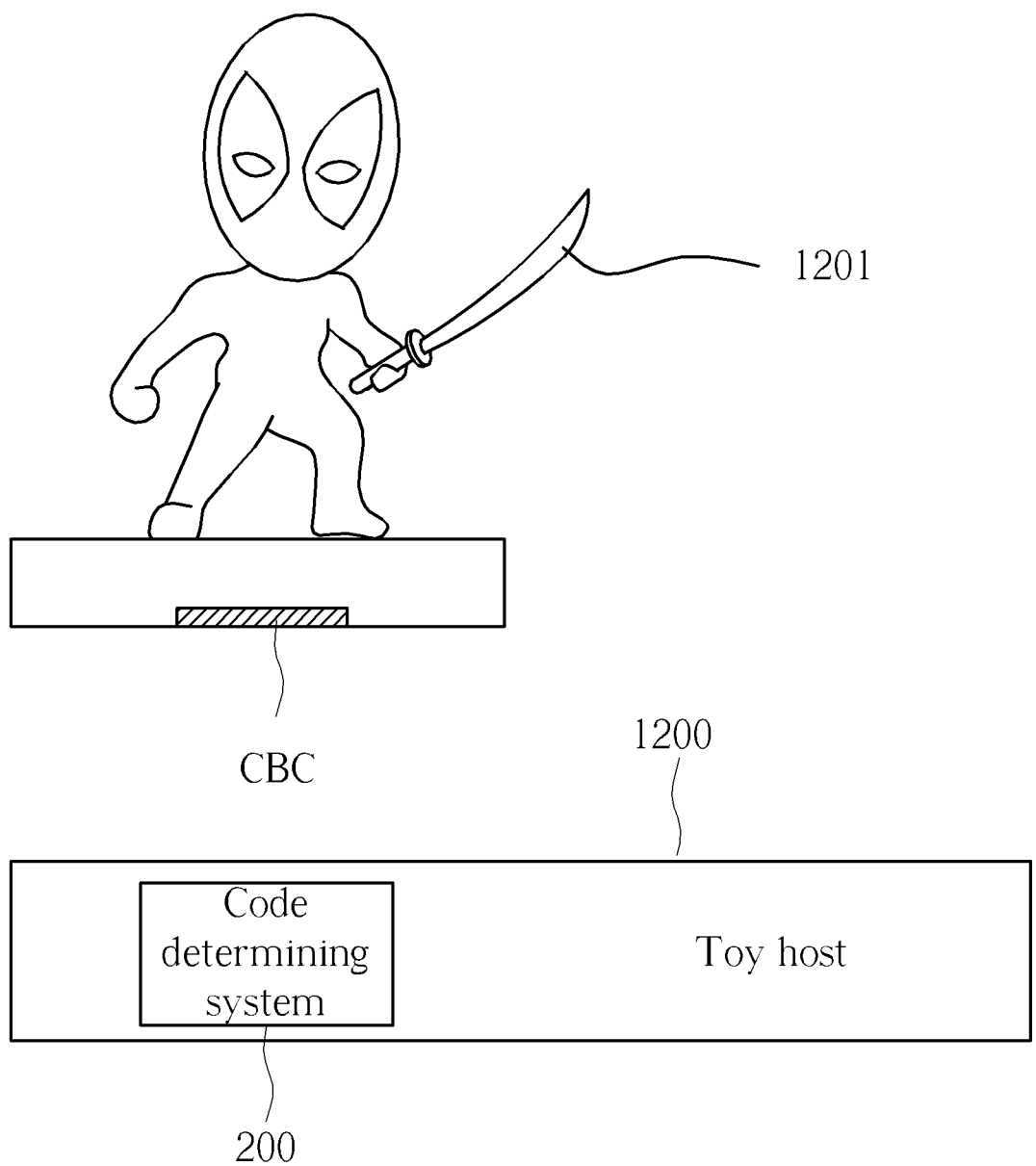

FIG. 12 is a schematic diagram illustrating another example for the application of a color bar code. In the example of FIG. 12, the code determining system 200 is located in a toy host 1200 and the color bar code CBC is located in a toy 1201 (e.g. a doll). After the code contained in the color bar code CBC is acquired by the code determining system 200, the toy host 1200 operates according to the code. The color bar code CBC can be designed corresponding to the kind of the toy 1201. For example, if the toy 1201 is a soldier doll, the color bar code CBC can be designed to control the toy host 1200 to play sound of swinging a sword. For another example, if the toy 1201 is a dragon doll, the color bar code CBC can be designed to control the toy host 1200 to display images of spitting fire.

In view of above-mentioned embodiments, the color bar code can comprise more information than a conventional bar code since the code contained in the color bar code depends on color kind or color sequence of various colors. Besides, the color determining system can more easily acquire a correct code since more than one code block are included in the color bar code.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A color bar code, comprising
a first code block, comprising:

a header region, comprising at least one header color bar, wherein each of the header color bar has a specific color, wherein the header color bar includes a predetermined asymmetric optical feature; and a code region, comprising a plurality of code color bars having different respective color kinds, wherein a number of the respective color kinds is at least two;

wherein a color sequence of the code color bar indicates a code.

2. The color bar code of claim 1, further comprising a second code block following an ending of the first code block, wherein the second code block comprises a header region having an arrangement the same as an arrangement for the header region of the first code block, and comprises a code region having an arrangement the same as an arrangement for the code region of the first code block.

3. The color bar code of claim 1, wherein the header color bar and the code color bar of the first code block are arranged following a first direction, wherein the color bar code further comprises a second code block comprising a header region with at least one header color bar and a code region with a plurality of code color bars having different respective color kinds, wherein the header color bar and the code color bar of the second code block are arranged following a second direction, wherein an angle between the first direction and the second direction is larger than 0°.

4. The color bar code of claim 1, further comprising at least one of a buffer region which is located between two adjacent ones of the header color bars, between two adjacent ones of the code color bars, between the code color bar and the header color, and between the first code block and a neighboring second code block.

5. The color bar code of claim 1, wherein the predetermined asymmetric optical feature comprises at least one of following optical features: a width of the header color bar, a shape of the header color bar, a color sequence of a plurality of the header color bars, and a color variation of a plurality of the header color bars.

6. The color bar code of claim 1, wherein the code corresponds to the sequence of at least three of the color kinds.

7. The color bar code of claim 1, wherein the sequence of two of the color kinds indicates the code which has a plurality of numerals.

8. A code determining method, for determining a code contained in a color bar code comprising a first code block including a header region with at least one header color bar and a code region with a plurality of code color bars having different respective color kinds, comprising:

(a) determining a starting point based on the header region; and (b) determining the code contained in the color bar code based on a color sequence of the code color bar;

wherein the header color bar includes a predetermined asymmetric optical feature;

wherein each of the header color bar has a specific color;

wherein a number of the respective color kinds is at least two.

9. The code determining method of claim 6, further comprising:

applying a color bar code reader comprising a plurality of scan lines to scan the color bar code;

wherein the step (b) comprises:

(b1) respectively determining a code contained in the color bar code scanned by each of the scan lines to acquire a plurality of candidate codes;

(b2) selecting a most possible code from the candidate codes as the code determined in the step (b).

10. The code determining method of claim 9, wherein the step (b2) comprises:

determining a number of the scan lines which each of the candidate codes correspond to; and selecting the candidate code which correspond to a maximum number of scan lines as the code determined in the step (b).

11. The code determining method of claim 8, wherein the color bar code further comprises a second code block following an ending of the first code block, wherein the second code block comprises a header region having an arrangement the same as an arrangement for the header region of the first code block, and comprises a code region having an arrangement the same as an arrangement for the code region of the first code block, and the code determining method further comprising: determining the code contained in the color bar code based on a color sequence for a combination of at least one the code color bar of the first code block and at least one the code color bar of the second code block.

12. The code determining method of claim 8, wherein the header color bar and the code color bar of the first code block are arranged following a first direction, wherein the color bar code further comprises a second code block comprising a header region with at least one header color bar and a code region with a plurality of code color bars, wherein the header color bar and the code color bar of the second code block are arranged following a second direction, wherein an angle between the first direction and the second direction is larger than 0°.

13. The code determining method of claim 8, wherein the color bar code further comprises at least one of a buffer region located between two adjacent ones of the header color bars, between two adjacent ones of the code color bars, between the code color bar and the header color, and between the first code block and a neighboring second code block.

14. The code determining method of claim 8, wherein the predetermined asymmetric optical feature comprises at least one of following optical features: a width of the header color bar, a shape of the header color bar, a color sequence of a plurality of the header color bars, and a color variation of a plurality of the header color bars.

15. A code determining system, for determining a code contained in a color bar code region comprising a first code block including a header region and a code region, wherein the header region comprises at least one header color bar including a predetermined asymmetric optical feature and wherein the code region comprises a plurality of code color bars having different respective color kinds, the code determining system comprising:

a color bar code reader, configured to read the color bar code; and a code determining circuit, configured to determine a starting point according to the header region and to determine the code contained in the color bar code according to a color sequence of the code color bar, based on the color bar code read by the color bar code reader;

wherein each of the header color bar has a specific color;

wherein a number of the respective color kinds is at least two.

16. The code determining system of claim 15, wherein the color bar code reader comprising a plurality of scan lines, wherein the code determining circuit respectively determines a code indicated by the code color bars read by each of the scan lines to acquire a plurality of candidate codes, and selects a most possible code from the candidate codes as the code contained in the color bar code.

17. The code determining system of claim 16, wherein the code determining circuit determines a number of the scan lines which each of the candidate codes correspond to, and selects the candidate code which correspond to a maximum number of scan lines as the code contained in the color bar code.

18. The code determining system of claim 15, wherein the color bar code further comprises a second code block following an ending of the first code block, wherein the second code block comprises a header region having an arrangement the same as an arrangement for the header region of the first code block, and comprises a code region having an arrangement the same as an arrangement for the code region of the first code block.

19. The code determining system of claim 18, wherein the code determining circuit determines the code contained in the color bar code based on a color sequence for a combination of at least one the code color bar of the first code block and at least one the code color bar of the second code block.

20. The code determining system of claim 15, wherein the header color bar and the code color bar of the first code block are arranged following a first direction, wherein the color bar code further comprises a second code block comprising a header region with at least one header color bar and a code region with a plurality of code color bars, wherein the header color bar and the code color bar of the second code block are arranged following a second direction, wherein an angle between the first direction and the second direction is larger than 0°.

21. The code determining system of claim 15, wherein the color bar code further comprises at least one of a buffer region located between two adjacent ones of the header color bars, between two adjacent ones of the code color bars, between the code color bar and the header color, and between the first code block and a neighboring second code block.

22. The code determining system of claim 15, wherein the predetermined asymmetric optical feature comprises at least one of following optical features: a width of the header color bar, a shape of the header color bar, a color sequence of a plurality of the header color bars, and a color variation of a plurality of the header color bars.

23. A color bar code, comprising
a first code block, comprising:
a header region, comprising at least one header color bar; and
a code region, comprising a plurality of code color bars having different respective color kinds;
wherein a color sequence of the code color bar indicates a code, and a color kind or a color sequence of the header color bar indicates the position of the first code block;
wherein each of the header color bar has a specific color;
wherein a number of the respective color kinds is at least two.

* * * * *